Aug. 27, 1957     L. P. BIEFELD ET AL     2,804,438
FIBROUS GLASS REINFORCED RESINOUS MOLDING COMPOUND
Filed Oct. 14, 1952
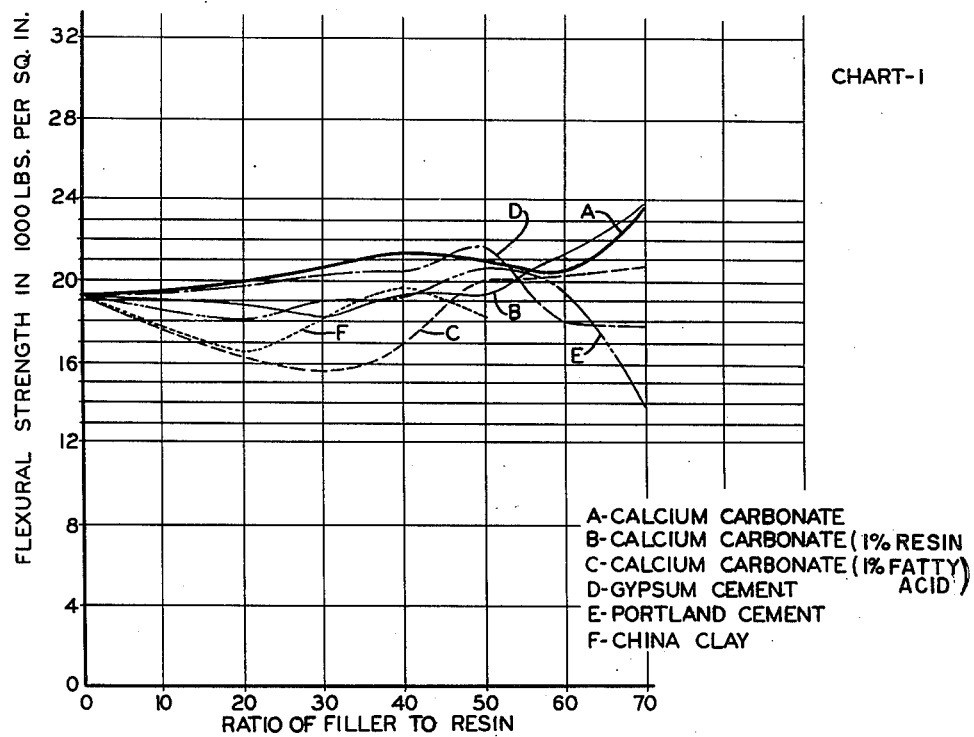
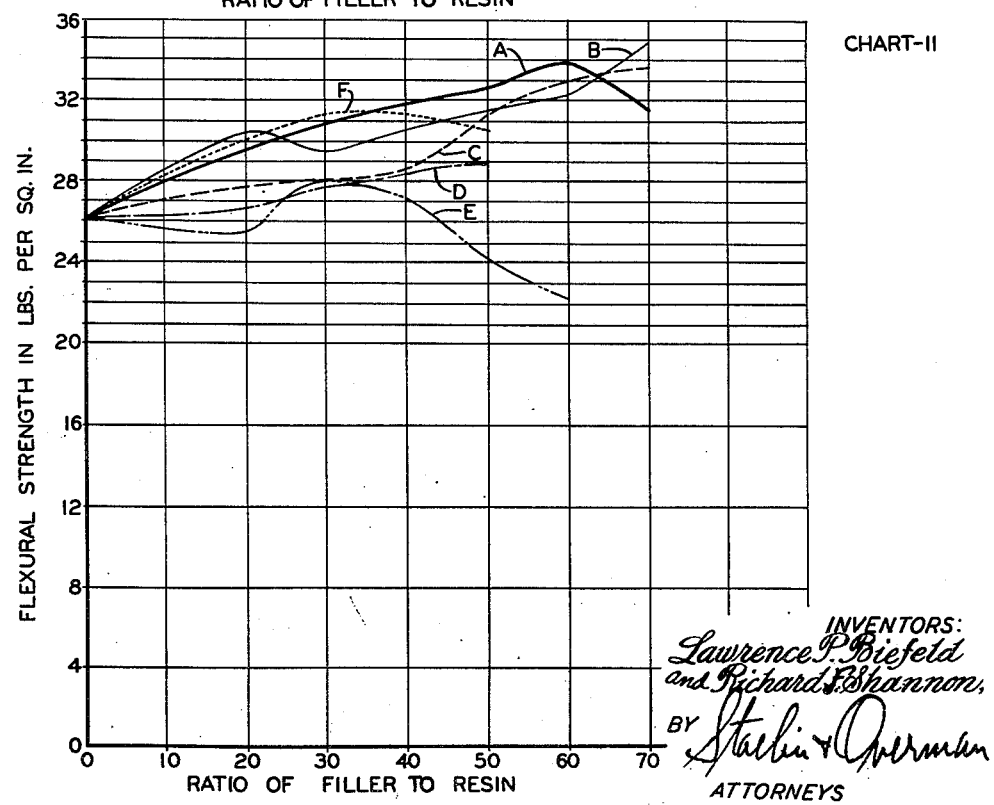

United States Patent Office 2,804,438
Patented Aug. 27, 1957

2,804,438

FIBROUS GLASS REINFORCED RESINOUS MOLDING COMPOUND

Lawrence P. Biefeld, Granville, and Richard F. Shannon, Lancaster, Ohio, assignors to Owens-Corning Fiberglas Corporation, a corporation of Delaware Application October 14, 1952, Serial No. 314,642

12 Claims. (Cl. 260—22)

This invention relates to products molded of thermosetting resinous material reinforced with glass fibers and it relates to new and improved compositions for use in the manufacture of same.

This invention is concerned chiefly with the preparation of a molding compound for the manufacture of laminates and preferably for the compression molding of products based upon the use of a thermosetting resinous material containing substantial amounts of glass fibers as a reinforcement and strengthening agent and as a stabilizing agent for rendering the product molded more resistant to deterioration and attack. While glass fibers are in the form of rod-like members having perfectly smooth surfaces and which are incapable of resin absorption so that they do not have a noticeable effect on viscosity or flow as compared to the more absorbent porous cotton, asbestos and hemp fibers, which have heretofore been used, nevertheless the viscosity and flow of slurries used in the manufacture of laminates and in the molding compounds for compression molding are substantially increased by the presence of glass fibers. Up to 25–30 percent by weight of glass fibers can be incorporated when the fibers are preformed into a fabric having the contour of the molded product so that fiber redistribution will not take place during flow of the resinous binder about the fibers. Where the molding compound must flow under molding conditions to fill the mold, the amount of glass fibers has been limited in the past to between 1–10 percent by weight.

As used herein, the term "low glass" is meant to include laminates formed with glass fibers of reinforcing lengths within the range of 1–12 percent by volume. The term "high glass" is meant to include laminates formed with glass fibers greater than 12 percent by volume and up to about 24 percent by volume. The term "percent" as it is used at times in connection with the filler is meant to refer to the percent of resin filler combination or the ratio of filler to resinous binder.

Since the ordinary mastication processes cannot be used with glass fibers to advance and distribute the resinous material, molding compositions embodying glass fibers as a reinforcement have been limited to combinations with liquid binders capable of being converted to a hard and set stage by reaction with heat and/or catalyst. These include the group of resinous materials generally referred to as the low pressure molding or laminating resins formed of phenol formaldehyde resin, urea formaldehyde resin, and more often of the unsaturated polyester resins which may be used unmodified or else modified with monomers capable of addition polymerization, such as styrene, vinyl acetate, acrylate and the like. From the standpoint of cost and ease of molding, it is desirable and it is another object of this invention to be able to make use of liquid resins of the type described, especially the unsaturated polyesters, as the resinous binder in molding compositions of the type described and it is also desirable to make use of as little resin and as much filler as possible in order to reduce the cost and in order to eliminate the stickiness of high resin low filler compositions to provide a relatively free flowing molding composition, but without loss of strength or other physical properties in the molded product.

It is another object to produce a molding composition of the type described, containing glass fibers as a reinforcement, having strengths and other physical properties at least comparable to those produced by conventional urea formaldehyde and phenol formaldehyde compression molded products and which are of lower cost thereby advantageously to enable use of such glass fiber reinforced molded products in applications heretofore limited to the phenol formaldehyde and urea formaldehyde systems.

In order to reduce the cost of the molded products based upon the use of the polyesters and glass fibers, it is desirable to reduce the concentration of resinous binder in the molded product but without marked reduction in the ease of handling of the molding composition and without marked reduction in the strength properties of the products molded thereof. Attempts have been made to substitute various finely divided fillers for resinous material in the molding composition. Common fillers of the type clay, diatomaceous earth, silica, chalk, gypsum and Portland cement can be substituted for the resin in molding compositions of the type described in ratios up to 40 parts by weight of filler to 60 parts by weight of resin. When amounts in excess of 40 parts by weight are incorporated, the strength properties of the product molded therefrom begin to fall off markedly. With low glass compositions, fillers of the type described cannot be incorporated in amounts in excess of 50 percent by weight without reducing the flow of the molding composition to the extent that a suitable molded product can be secured. With high glass, the amount of filler which can be used is limited to 40 parts by weight to 60 parts of the resinous material.

Therefore, another object of this invention is to produce a new and improved molding composition in which fillers in amounts greater than 50 percent based upon the total of filler and resin may be incorporated without decreasing the flow properties of the molding composition, with improvement in the handling properties thereof and with an unexpected improvement in the strength properties when used in combination with liquid unsaturated polyester resinous binders thereby to enable further reduction in the cost of the molded product and improvement in the physical properties thereof and permit advantageous substitution of molding compositions of the type described for conventional urea formaldehyde and phenol formaldehyde compression molding materials and it is a related object to produce a new and improved molded product from same.

In accordance with the practice of this invention, moldability and unexpected improvements in physical properties are secured when calcium carbonate in finely divided form in amounts in excess of equal parts by weight of the resinous material is used as a filler, particularly in combination with unsaturated polyesters as the resinous binder. This discovery of the use of a filler in excess of 50 percent by weight is the more remarkable because such large amounts over the amount of 40 percent heretofore considered impossible are capable of being used with high glass as well as low glass molding compositions and with an unexpected increase in the strength properties in low glass and high glass molding compositions and in compression molding compositions containing up to 10 percent by weight glass fibers. Thus unexpected tolerance for higher ratios of calcium carbonate filler to resin with further increases in strength of the molded product also enhances the characteristics which enable the manufacture of a molding composition which, because of the higher ratio of filler to resin provides a drier, less tacky composition which is easier to measure and handle during molding operations. It is possible in accordance with the practice of this invention to provide for an increase in the strength properties thereby to provide a new and improved low cost molded product which may be used to advantage instead of compositions heretofore molded of conventional urea formaldehyde and phenol formaldehyde molding materials.

Such unexpected improvements resulting from the use of calcium carbonate in amounts considerably greater than that heretofore considered possible as a filler in combination with glass fibers in resinous plastics appear to be independent of the treatment of the particular calcium carbonate for modification of the surface characteristics thereof. Such improvements and results have been secured with calcium carbonate free of any previous treatment and with calcium carbonate treated with a small amount, such as 1 percent, resin, or treated with a small amount, such as 1 percent, of a fatty acid or fatty acid soap.

The unexpected and unique results secured by the use of calcium carbonate as a filler in amounts in excess of 50 percent and up to 75 percent by weight based upon the amount of filler and resin, may be illustrated by comparisons made with molding compositions wherein the various ingredients are present in similar proportions but in which other fillers of the conventional types are used. Chart 1 compares the properties of low glass molding compositions wherein glass fibers are incorporated in amounts to provide 11 percent by volume in the molded product. The ratio of ingredients without filler is represented by the following Example 1. For subsequent formulations containing increasing amounts of filler, the proportions of ingredients in Example 1 remain substantially the same except for adjustments with respect to glass fiber concentrations to maintain equivalent volumes in the final product as represented by the following Examples 2–5 for the ratios of 30, 40, 60 and 70 parts by weight filler to 70, 60, 40 and 30 parts by weight resin, respectively.

EXAMPLE 1

22.0 percent by weight glass fibers
2.5 percent by weight binder on the glass fibers
74.0 percent by weight propylene maleate phthalate containing approximately 30% monomeric styrene
1.5 percent by weight benzoyl peroxide catalyst

EXAMPLE 2

70–30 ratio of filler to resin:
    20.4 percent by weight glass fibers
    2.3 percent by weight binder on the glass fibers
    53.0 percent by weight propylene maleate phthalate containing approximately 30% monomeric styrene
    1.1 percent by weight benzoyl peroxide catalyst
    23.2 percent by weight calcium carbonate filler

EXAMPLE 3

40–60 ratio of filler to resin:
    18.8 percent by weight glass fibers
    2.1 percent by weight binder on the glass fibers
    46.6 percent by weight liquid polyester resin
    0.9 percent by weight benzoyl peroxide catalyst
    31.6 percent by weight calcium carbonate filler

EXAMPLE 4

60–40 ratio of filler to resin:
    15.7 percent by weight glass fibers
    1.7 percent by weight binder on the glass fibers
    32.4 percent by weight liquid polyester resin
    0.6 percent by weight catalyst
    49.5 percent by weight calcium carbonate filler

EXAMPLE 5

70–30 ratio of filler to resin:
    13.8 percent by weight glass fibers
    1.5 percent by weight binder on the glass fibers
    24.9 percent by weight liquid polyester resin
    0.5 percent by weight catalyst
    59.3 percent by weight filler The following examples represent formulations for high glass compositions containing 22 percent by volume glass fibers in each. Example 6 is the basic formulation without any filler, while Examples 7, 8 and 9 represent formulations with 40, 60 and 70 parts by weight filler to 60, 40 and 30 parts by weight resin, respectively.

EXAMPLE 6

41.7 percent by weight glass fibers
4.6 per cent by weight binder on the glass fibers
52.6 percent by weight propylene maleate phthalate containing approximately 30% monomeric styrene
1.0 percent by weight catalyst

EXAMPLE 7

40–60 ratio of filler to resin:
    35.2 percent by weight glass fibers
    3.9 percent by weight binder on the glass fibers
    35.9 percent by weight liquid polyester resin
    0.7 percent by weight catalyst
    24.3 percent by weight calcium carbonate filler

EXAMPLE 8

60–40 ratio of filler to resin:
    30.6 percent by weight glass fibers
    3.4 percent by weight binder on the glass fibers
    25.9 percent by weight liquid polyester resin
    0.5 percent by weight catalyst
    39.6 percent by weight calcium carbonate filler

EXAMPLE 9

70–30 ratio of filler to resin:
    27.3 percent by weight glass fibers
    3.0 percent by weight binder on the glass fibers
    20.5 percent by weight liquid polyester resin
    0.4 percent by weight catalyst
    48.8 percent by weight calcium carbonate filler

*Procedure*

In each of the above formulations, the catalyst is first incorporated with stirring into the resinous solution with precautions taken to incorporate minimum amounts of air. The filler is slowly added with stirring to produce a smooth slurry.

In the manufacture of the laminate for testing, the slurry was spread over the layer of each bonded glass fiber mat until the laying up process was completed. The layup was then placed in the press for molding without pressure after the mold had been closed under about 440 pounds p. s. i. to stops set at ⅛ inch. Resinous cure was set out at a temperature within the range of 240–260° F. on a 6 minute cycle.

Flexural strength, which represents one of the more important properties of glass fiber filled plastics, was used as representative of the physical strength properties in the preparation of the charts previously mentioned. Chart 1 is for the low glass filler and Chart 2 compares the strength properties secured for various fillers for high glass compositions.

It will be seen from the results that it was impossible in the low glass range to produce to slurry capable of sufficient flow to produce a molding composition when more than 50 percent china clay was present and that it was impossible to produce a slurry capable of sufficient flow in a high glass composition when more than 50 percent china clay or gypsum cement was present or when more than 60 percent Portland cement was present. On the other hand, little effect on flow was secured by the increase in the ratio of calcium carbonate, modified or unmodified, when present in ratios in excess of 50 percent by weight and when present in amounts as high as 70–75 parts by weight calcium carbonate to 30–25 parts by weight resin.

The strength properties of the molded product were found to decrease at accelerated rates when gypsum, china clay or Portland cement was embodied in the molding composition in ratios greater than 50 parts by weight per 50 parts of resinous material in the low glass composition. Contrary to expectations, a corresponding drop in strength properties was not experienced with low glass plastics containing calcium carbonate as the filler. Instead, when present in ratios greater than 50–50, the strength properties of the molded plastic rose to levels not heretofore secured with filled plastics of the types described. The same type of new and novel characteristics, experienced only with calcium carbonate, were also secured in the high glass compositions except that with other fillers the strength properties began to fall off when present in ratios beyond 40 parts by weight filler to 60 parts by weight resin.

The unexpected improvements in strength properties and moldability with decreasing amounts of resinous binder and increasing amounts of low cost filler constitutes an important advance in the art of molded plastics. The ability to secure flow of slurries containing the higher ratios of filler to resin was also secured when the same combinations of materials were embodied in compression molding compositions containing glass fibers of reinforcing lengths intimately mixed therewith. This invention makes available for the first time a lower cost plastic of increased strength thereby to enable substitution for molding compositions of the phenol formaldehyde and urea formaldehyde type which are relatively expensive, which require a high concentration of resinous material and which do not possess sufficient impact strength, resistance to moisture absorption and the like. The unexpected improvement in strength with high glass as well as with low glass provides a molded product having a range of strength properties not heretofore considered available with compositions of the type described and without having to compensate by depreciation in moldability and with a material decrease in cost.

It has been found that when the amount of calcium carbonate is present in the molded composition in ratios greater than 60 percent by weight based upon the resin filler combination, other conventional fillers in small amounts up to 10 percent by weight can be incorporated without reversing the effects heretofore described. Such other fillers include china clay, silica, diatomaceous earth, gypsum, Portland cement, ground glass and the like.

As the glass fiber component, use may be made of bonded mat of the type described to form a molded laminate or use may be made of bonded mat of the type described cut or chopped into small pieces to produce a compression molding composition but it is preferred to make use of glass fibers in the form of bundles, strands, yarns, rovings or threads formed of continuous or staple fibers and cut or chopped to shorter lengths such as within the range of about ¼–2 inches. Use may also be made of woven fabrics but for purposes of providing loss in flow, such fabrics should be cut or chopped into smaller pieces.

The following represent compositions embodying features of this invention for molding under pressure and/or with catalyst for cure into a set molded product:

EXAMPLE 10

62.3 percent by weight calcium carbonate filler
6.2 percent by weight china clay
1.0 percent by weight zinc stearate
25.0 percent by weight propylene maleate phthalate containing approximately 30% monomeric styrene
0.5 percent by weight peroxide catalyst (Luperco ATC)
5.0 percent by weight glass fiber strands cut to ½ inch lengths

EXAMPLE 11

73.0 percent by weight calcium carbonate filler coated with 1 percent by weight stearic acid
24.1 percent by weight liquid low pressure laminating resin
0.5 percent by weight benzoyl peroxide modified with tricresol phosphate
1.9 percent by weight glass fiber strands cut to ¼ inch lengths
0.5 percent by weight styrene monomer

EXAMPLE 12

67.5 percent by weight calcium carbonate filler coated with 1 percent by weight vinyl acetate resin
29.0 percent by weight liquid low pressure laminating resin
0.5 percent by weight catalyst
1.0 percent by weight zinc stearate
2.0 percent by weight glass fiber strands cut to ½ inch lengths The catalyst in each of the above examples was first incorporated with the resinous material and then the fillers were added with mixing in a Hobart type mixer followed by the addition of the styrene monomer, when present, and the fibrous glass. The type of mixer employed should subject the material, during the mixing in of the fibrous glass, to a stirring action rather than a milling or grinding action, to guard against attrition of the fibrous material to the extent that would impair the strength of the finished product.

Molding was carried out under low pressure within the range of 0–500 pounds p. s. i. and at temperatures within the range of 240–3500° F. for 2–6 minutes. The molding was done in semi-positive matched metal molds and the pressure was used to bring the male mold down to stops.

The low glass high filler molding compositions of the type described make available a low cost molding product which may be used in substitution for conventional urea formaldehyde and phenol formaldehyde molding compounds. This may be illustrated by the following table comparing the strength, impact and moisture absorption characteristics of a conventional urea formaldehyde molded product, a conventional phenol formaldehyde wood filled product, with a product molded of the composition of Example 12 which embodies features of this invention. While the strength properties are comparable, it will be apparent that a tremendous improvement is secured in impact strength and water absorption in products molded of compositions embodying features of this invention.

| | Glass Molding Compound, Example 12 | Phenolic | Urea |
|---|---|---|---|
| Flexural strength (p. s. i.): | | | |
| Dry | 11,000 | 11,000 | 11,000 |
| 1 Day wet | 11,000 | 12,000 | 14,000 |
| 14 Days wet | 9,000 | 9,000 | 10,000 |
| Izod Notched Edge: Impact Strengths (ft. lbs.) | 4.4 | 0.4 | 0.3 |
| Water Absorption (percent one day) | 0.17 | 0.68 | 0.45 |

It will be understood that changes may be made in the ratios of ingredients, their method of incorporation and molding without departing from the spirit of the invention, especially as defined in the following claims.

We claim:

1. A composition for molding to a set stage comprising a thermosetting liquid low pressure laminating resin in an uncured state, glass fibers incorporated in the resinous material in an amount ranging from 1 to 25 percent by volume of the product to be molded and calcium carbonate in finely-divided form combined with the resinous material as a diluent in amounts in excess of 50 percent by weight but less than 75 percent by weight of the total of the resin and diluent.

2. A composition for molding to a set stage comprising a resin selected from the group consisting of an unsaturated alkyd and copolymers thereof with a monomer of the group consisting of styrene, and vinyl acetate, said resin being in a liquid and uncured stage, glass fibers of reinforcing lengths combined with the resinous material in an amount ranging from 1 to 25 percent by volume of the product to be molded and calcium carbonate in finely-divided form as the principal filler in combination with the resinous material and present in an amount in excess of 50 percent by weight but less than 75 percent by weight of the total resin and diluent.

3. A composition for molding to a set stage comprising a liquid unsaturated polyester resin in an intermediate stage of polymeric growth, glass fibers of reinforcing lengths present in amounts to form 1 to 25 percent by volume of the molded product and calcium carbonate in finely-divided form combined with the resinous material as a diluent in amounts in excess of 50 percent by weight up to about 75 percent by weight based upon the total of resin and diluent.

4. A molding composition consisting essentially of a resin selected from the group consisting of an unsaturated alkyd and copolymers thereof with a monomer of the group consisting of styrene, and vinyl acetate in an intermediate stage of polymeric growth, from 1 to 25 percent by volume glass fibers of reinforcing lengths combined with the resinous material, calcium carbonate in finely-divided form combined with the resinous material as a filler and present in an amount in excess of 50 percent by weight but less than 75 percent by weight of the total resin and diluent.

5. A molding composition as claimed in claim 4 characterized by the fact that it forms a compression molding composition containing glass fibers of reinforcing lengths in amounts up to 10 percent by volume of the product to be molded.

6. A molding composition as claimed in claim 4 in which up to 10 percent by weight of other inert fillers are incorporated in combination with the calcium carbonate.

7. A molding composition as claimed in claim 4 in which the calcium carbonate particles are coated with a fatty acid.

8. A compression molding composition consisting essentially of a liquid resin selected from the group consisting of an unsaturated alkyd and copolymers thereof with a monomer of the group consisting of styrene, and vinyl acetate in an intermediate stage of polymeric growth, 1 to 10 percent by volume glass fibers of reinforcing lengths incorporated with the resinous material, and calcium carbonate in finely-divided form as a filler present in an amount in excess of 50 percent by weight but less than 75 percent by weight of the total resin and diluent.

9. A laminating composition consisting essentially of a liquid resin selected from the group consisting of an unsaturated alkyd and copolymers thereof with a monomer of the group consisting of styrene, and vinyl acetate in an intermediate stage of polymeric growth, 12 to 25 percent by volume glass fibers of reinforcing lengths combined with the resinous material, and calcium carbonate in finely-divided form combined with the resinous material as a filler and present in an amount in excess of 50 percent by weight but less than 75 percent by weight of the total resin and diluent.

10. A molded product consisting essentially of a cured resin selected from the group consisting of an unsaturated alkyd and copolymers thereof with a monomer of the group consisting of styrene, and vinyl acetate, 12 to 25 percent by volume glass fibers of reinforcing lengths and calcium carbonate in finely-divided form present as a filler in combination with the resinous material and present in an amount in excess of 50 percent by weight but less than 75 percent by weight of the total resin and diluent.

11. A molded product as claimed in claim 10 in which up to 10 percent by weight of other fillers are present in combination with the calcium carbonate.

12. A molded product as claimed in claim 10 in which the particles of calcium carbonate in the molded product are coated with a fatty acid.

References Cited in the file of this patent

UNITED STATES PATENTS

| | | |
|---|---|---|
| 2,255,313 | Ellis | Sept. 9, 1941 |
| 2,467,526 | Harris | Apr. 19, 1949 |